US010480048B2

(12) United States Patent
Hori

(10) Patent No.: US 10,480,048 B2
(45) Date of Patent: Nov. 19, 2019

(54) METHOD FOR RECOVERING RHENIUM, METHOD FOR SELECTIVELY RECOVERING RHENIUM FROM SOLUTION INCLUDING RHENIUM AND OTHER METALS, AND METHOD FOR INCREASING CONTENT RATIO OF RHENIUM IN SOLUTION INCLUDING RHENIUM AND OTHER METALS

(71) Applicants: KANAGAWA UNIVERSITY, Yokohama-shi, Kanagawa (JP); Asaka Riken Co., Ltd., Koriyama-shi, Fukushima (JP)

(72) Inventor: Hisao Hori, Yokohama (JP)

(73) Assignees: KANAGAWA UNIVERSITY, Yokohama-Shi, Kanagawa (JP); ASAKA RIKEN CO., LTD., Koriyama-Shi, Kukushima (JP)

( * ) Notice: Subject to any disclaimer, the term of this patent is extended or adjusted under 35 U.S.C. 154(b) by 160 days.

(21) Appl. No.: 15/746,779

(22) PCT Filed: Jul. 22, 2016

(86) PCT No.: PCT/JP2016/071647
§ 371 (c)(1),
(2) Date: Jan. 22, 2018

(87) PCT Pub. No.: WO2017/018364
PCT Pub. Date: Feb. 2, 2017

(65) Prior Publication Data
US 2019/0010579 A1    Jan. 10, 2019

(30) Foreign Application Priority Data

Jul. 24, 2015   (JP) .................................. 2015-147256

(51) Int. Cl.
| | | |
|---|---|---|
| C22B 61/00 | (2006.01) | |
| C01G 47/00 | (2006.01) | |
| C22B 3/44 | (2006.01) | |

(52) U.S. Cl.
CPC .............. *C22B 61/00* (2013.01); *C01G 47/00* (2013.01); *C22B 3/44* (2013.01)

(58) Field of Classification Search
CPC ............ C01G 47/00; C22B 3/44; C22B 61/00
See application file for complete search history.

(56) References Cited

U.S. PATENT DOCUMENTS 3,495,934 A * 2/1970 Gerisch .................. C01G 47/00
423/50
7,763,096 B2 * 7/2010 Rizkalla ................. C01G 47/00
423/27

FOREIGN PATENT DOCUMENTS

| | | |
|---|---|---|
| JP | H05166423 A | 7/1993 |
| JP | 2010168629 A | 8/2010 |

(Continued)

OTHER PUBLICATIONS

JP 2013221171 machine translation of the description. (Year: 2013).*

(Continued)

*Primary Examiner* — Tima M. McGuthry-Banks
(74) *Attorney, Agent, or Firm* — Alleman Hall Creasman & Tuttle LLP

(57) ABSTRACT

A method is provided which can separate rhenium from a solution containing rhenium by a simple procedure in a shorter time. A method of selectively recovering rhenium from a solution containing rhenium and one or more different metals is also provided. A method of recovering rhenium is used. The method involves (A) adding an electron donor (aliphatic secondary alcohol or aliphatic secondary thioalcohol) and a ketone compound to a solution containing perrhenate ions, (B) irradiating the solution after the addi- (Continued)

tion step with ultraviolet light to precipitate a reduced species of the perrhenate ions contained in the solution, and (C) separating the reduced species of perrhenate ions from the solution, the reduced species being precipitated during the ultraviolet light irradiation.

10 Claims, 1 Drawing Sheet

(56) References Cited

FOREIGN PATENT DOCUMENTS

| JP | 2011058016 A | 3/2011 |
|---|---|---|
| JP | 2011062587 A | 3/2011 |
| JP | 2013221171 A | 10/2013 |

OTHER PUBLICATIONS

ISA Japan Patent Office, International Search Report Issued in PCT Application No. PCT/JP2016/071647, dated Sep. 13, 2016, WIPO, 2 pages. (Submitted with English Translation of International Search Report).

* cited by examiner

METHOD FOR RECOVERING RHENIUM, METHOD FOR SELECTIVELY RECOVERING RHENIUM FROM SOLUTION INCLUDING RHENIUM AND OTHER METALS, AND METHOD FOR INCREASING CONTENT RATIO OF RHENIUM IN SOLUTION INCLUDING RHENIUM AND OTHER METALS

TECHNICAL FIELD

The present invention relates to a method of recovering rhenium, a method of selectively recovering rhenium from a solution containing rhenium and one or more different metals, and a method of enriching rhenium in a solution containing rhenium and one or more different metals.

BACKGROUND ART

Rhenium, one of the minor metals, is widely used in the fields of catalysts used in reforming petroleum and the production of organic compounds, heat-resistant alloys, and electronic materials. Unfortunately, rhenium is becoming less commonly available because of its low supply and rising world-wide demand in recent years. Such circumstances lead to a demand for development of techniques for efficiently recovering rhenium from minerals containing rhenium and those for recycling rhenium from industrial wastewater or recovered products containing rhenium.

In such a background, for example, Patent Literature 1 discloses a method of separating rhenium. The method involves adding an alkali to a solution containing rhenium and undesired components to remove the undesired components as precipitate, adjusting the concentration of the acid in the solution within a predetermined range, adding a sulfidizing agent to generate sulfide precipitate containing rhenium sulfide, and recovering the precipitate.

Patent Literature 2 discloses a method of recovering rhenium. This method involves adding an ammonium compound, such as ammonium sulfate, to a solution containing rhenium, cooling the solution to generate a precipitate of $NH_4ReO_4$, and recovering the precipitate.

Patent Literature 3 discloses a method of recovering rhenium. The method involves adding a compound including a substituent with an atom having an unshared pair of electrons to a solution containing perrhenate ions, irradiating the solution with ultraviolet light to precipitate a reduced species of the perrhenate ions, and recovering the precipitate.

CITATION LIST

Patent Literature

Patent Literature 1: Japanese Patent Application Laid-Open No. 2011-58016
Patent Literature 2: Japanese Patent Application Laid-Open No. 2010-168629
Patent Literature 3: Japanese Patent Application Laid-Open No. 2013-221171

SUMMARY OF INVENTION

Technical Problem

Although the methods according to Patent Literatures 1 and 2 can separate rhenium from a solution containing rhenium, a means of more efficiently separating rhenium by a simpler procedure is required. The method according to Patent Literature 3 can efficiently recover rhenium by a simple procedure involving addition of a compound, such as alcohol, to a solution and then irradiation of the solution with ultraviolet light. The follow-up experiments by the present inventor reveal that the method takes about 10 hours from the start of irradiation with ultraviolet light to the start of precipitation of rhenium. The present invention has been made in consideration of such circumstances. An object of the present invention is to provide a method of separating rhenium from a solution containing rhenium by a simpler procedure in a shorter time.

Rhenium is classified as a minor metal because of its low supply. Most rhenium is yielded in a small amount of by-product during extraction of other metals, such as extraction of molybdenum from molybdenum ore. For this reason, extraction of the minor metal rhenium is always accompanied by technical difficulties during an operation of separating a small amount of rhenium from the main metal. In consideration of such circumstances, an object of another aspect of the present invention is to provide a method of selectively recovering rhenium from a solution containing rhenium and one or more different metals.

Solution to Problem

The present inventor, who has conducted extensive research to solve the issues, has found that addition of a compound, such as alcohol, to a solution containing perrhenate ions and then irradiation of the solution with ultraviolet light according to the procedure described in Patent Literature 3 causes a ketone compound to accumulate in the solution with time and a reduced species of the perrhenate ions to start to precipitate after the content of the ketone compound in the solution exceeds a predetermined value. In other words, the present inventor presumed that the induction time from the start of irradiation with ultraviolet light to the start of precipitation of the reductant of the perrhenate ions is needed for the accumulation of the ketone compound. Based on such knowledge, the present inventor has found that the induction time can be zero or can be significantly reduced if the ketone compound is preliminarily added to the solution before the ultraviolet light irradiation and then the precipitation operation is performed as described above. The present inventor has also found that in use of such a recovering method, the pH of the solution during the treatment can be appropriately controlled to predominantly precipitate the reduced species of the perrhenate ions or the co-existing metal compound(s), such as molybdenum, even if the co-existing metal(s) is present in the solution. The present invention has been made based on such knowledge, and provides the following aspects.

(1) The present invention is characterized by a method of recovering rhenium, involving (A) adding an electron donor and a ketone compound to a solution containing the perrhenate ions, the electron donor being an aliphatic secondary alcohol or an aliphatic secondary thioalcohol; (B) irradiating the solution with ultraviolet light to precipitate a reduced species of the perrhenate ions contained in the solution; and (C) separating the reduced species of the perrhenate ions from the solution, the reduced species being precipitated during the ultraviolet light irradiation.

(2) In step (B), the solution to be irradiated with ultraviolet light preferably has a pH of 6.3 or higher.

(3) The electron donor is preferably an aliphatic secondary alcohol.

(4) The electron donor is preferably 2-propanol.

(5) The ketone compound is preferably acetone.

(6) The present invention is also characterized by a method of selectively recovering rhenium from a solution containing rhenium and one or more different metals. The method involves adding an electron donor and a ketone compound to a solution containing the perrhenate ions and at least one co-existing metal other than alkali metals and alkaline earth metals, the electron donor being an aliphatic secondary alcohol or an aliphatic secondary thioalcohol; adjusting the pH of the solution to be 6.3 or higher; and irradiating the solution with ultraviolet light to precipitate a reduced species of the perrhenate ions contained in the solution.

(7) The present invention is further characterized by a method of enriching rhenium in a solution containing rhenium and one or more different metals. The method involves adding an electron donor and a ketone compound to a solution containing the perrhenate ions and at least one co-existing metal other than alkali metals and alkaline earth metals, the electron donor being an aliphatic secondary alcohol or an aliphatic secondary thioalcohol; adjusting the pH of the solution to be 4.7 or lower; and irradiating the solution with ultraviolet light to precipitate a compound of the at least one co-existing metal contained in the solution.

(8) In Aspects (6) and (7), the at least one co-existing metal may be molybdenum.

Advantageous Effects of Invention

The present invention provides a method of separating rhenium from a solution containing rhenium by a simple procedure within a short time. The present invention also provides a method of selectively recovering rhenium from a solution containing rhenium and one or more different metals.

DESCRIPTION OF EMBODIMENTS

<Recovery of Rhenium>

Figure 1:
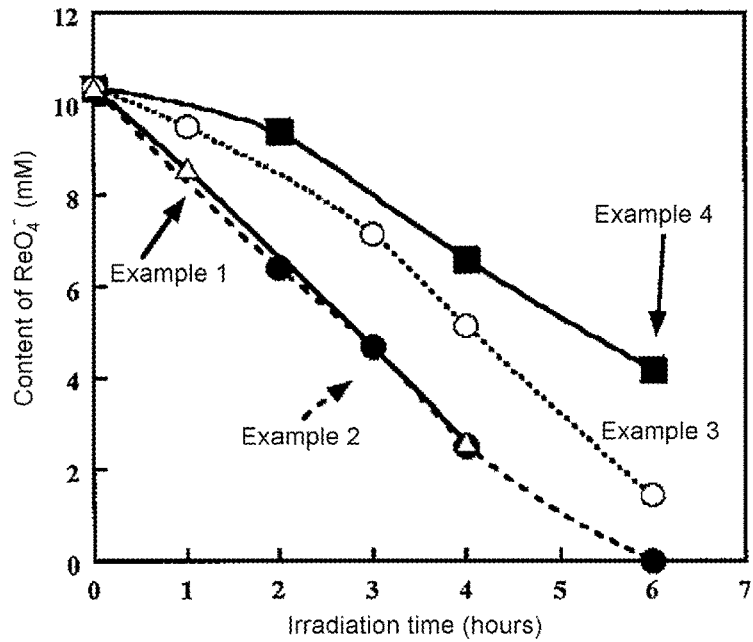
FIG. 1 is a graph representing a change in content of perrhenate ions plotted against the irradiation time in Examples 1 to 4.

An embodiment of the method of recovering rhenium according to the present invention will now be described. The following embodiment should not be construed to limit the present invention, and can be appropriately modified and implemented within the scope of the present invention.

The method of recovering rhenium according to the present invention involves (A) adding an electron donor and a ketone compound to a solution containing perrhenate ions, the electron donor being an aliphatic secondary alcohol or an aliphatic secondary thioalcohol; (B) irradiating the solution with ultraviolet light to precipitate a reduced species of the perrhenate ions contained in the solution; and (C) separating the reduced species of the perrhenate ions from the solution, the reduced species being precipitated during the ultraviolet light irradiation. The steps of this method will now be described.

Addition

In the addition step, an electron donor and a ketone compound are added to a solution containing the perrhenate ions. The electron donor is an aliphatic secondary alcohol or an aliphatic secondary thioalcohol. A preferred example of the solution containing the perrhenate ions is an aqueous solution. The solution contains rhenium in the form of perrhenate ions derived from ore containing rhenium or recovered products (recycled products) containing rhenium.

The perrhenate ion is a chemical species represented by $ReO_4^-$. In this chemical species, rhenium has an oxidation number of 7. The rhenium element is readily oxidized. For example, $ReO_3$, which is a compound of rhenium having an oxidation number of 6, is readily oxidized in the air or in a solution into the perrhenate ion $ReO_4^-$, which is an ion of rhenium having an oxidation number of 7. For this reason, it is believed that rhenium contained in the solution is mostly present in the form of the perrhenate ion. An appropriate oxidizing agent may be added to the solution to ensure the conversion of rhenium in the solution into the perrhenate ions. Examples of the oxidizing agent include hydrogen peroxide solution, sodium percarbonate, sodium hypochlorite, molecular oxygen, and air bubbles.

The solution can contain any content of perrhenate ions which can be dissolved in a solvent. An example content of the perrhenate ions can be about 1 mmol/L to 100 mmol/L.

After the perrhenate ions are excited by ultraviolet light during the irradiation step described later, the electron donor is added to donate electrons to the perrhenate ions for reduction. The electron donor to be used is an aliphatic secondary alcohol or an aliphatic secondary thioalcohol. The aliphatic secondary alcohol and the aliphatic secondary thioalcohol contain a hydroxyl or thiol group having an unshared pair of electrons. A perrhenate ion is reduced by an electron contained in the unshared pair of electrons. In other words, if rhenium contained in the perrhenate ions is excited by ultraviolet light during the irradiation, the electron donor having an unshared pair of electrons donates an electron to a rhenium atom, reducing heptavalent rhenium (i.e., perrhenate ion) to hexavalent rhenium, and further tetravalent rhenium. As a result of such reduction, the aliphatic secondary alcohol or the aliphatic secondary thioalcohol itself is oxidized into ketone or thioketone. For example, if the aliphatic secondary alcohol used as the electron donor is 2-propanol, perrhenic acid is reduced and acetone is generated.

Examples of the aliphatic secondary alcohol include 2-propanol, 2-butanol, and 2-pentanol. Examples of the aliphatic secondary thioalcohol include 2-propanethiol, 2-butanethiol, and 2-pentanethiol. Among these electron donors, preferred are aliphatic secondary alcohols, in particular 2-propanol.

The solution preferably contains a large excess amount of electron donor relative to the content of the perrhenate ions. An example content of the electron donor in the solution can be about 10 mmol/L to 10 mol/L. The ratio of the electron donor to the perrhenate ions in molar concentration can be 5- to 10000-fold, for example.

The ketone compound is added to shorten the induction time from the start of irradiation with ultraviolet light to the start of the precipitation of the reduced species of the perrhenate ion in the irradiation step (described later). Although it is not clear how the ketone compound causes such action, addition of the ketone compound may form a complex with the perrhenate ions, and facilitate the excitation of the perrhenate ions or the reduction reaction.

Preferred examples of the ketone compound include aliphatic ketones. Among these ketone compounds, preferred are acetone and methyl ethyl ketone, in particular acetone.

The content of the ketone compound in the solution is determined in consideration of the molar concentration of the perrhenate ions in the solution. The molar concentration of the ketone compound is preferably 0.5 to 3.0 times, more preferably 0.8 to 1.2 times the molar concentration of the perrhenate ions contained in the solution.

In this step, the pH of the solution is preferably adjusted to 6.3 or higher. Such adjustment of the pH is preferred because the reduced species of the perrhenate ions is selectively precipitated in the subsequent irradiation step with ultraviolet light if a co-existing metal(s) (other than alkali metals and alkaline earth metals: the same applies hereinafter) different from rhenium is contained. The pH adjustment is also preferred even if the co-existing metal(s) is not contained, because the precipitation of the reduced species of the perrhenate ions can be facilitated to increase the yield of recovered rhenium. The pH of the solution can be adjusted by, but should not be limited to, addition of an aqueous sodium hydroxide solution or an aqueous hydrochloric acid solution.

The solution containing the perrhenate ions after the addition of the electron donor and the ketone compound in this step is fed to the ultraviolet light irradiation step.

Ultraviolet Light Irradiation

In the ultraviolet light irradiation step, the solution after the addition step is irradiated with ultraviolet light to precipitate the reduced species of the perrhenate ions contained in the solution. At this time, the heptavalent rhenium compound, i.e., perrhenate ion ($ReO_4^-$) is reduced to a hexavalent rhenium compound $ReO_3$, and further a tetravalent rhenium compound $ReO_2$, and then is precipitated.

As described above, the rhenium atoms contained in the perrhenate ions are excited to be reduced by ultraviolet light during this irradiation step. For this reason, the ultraviolet light to be used should have a wavelength absorbed by the perrhenate ions. Ultraviolet light having a wavelength of 300 nm or lower can be used because the perrhenate ions have a broad band of absorption at a wavelength of 300 nm or lower. The ultraviolet light to be used, at least, has a wavelength of 300 nm or lower, and may contain a visible light component in addition of the ultraviolet light component having a wavelength of 300 nm or lower. Examples of light sources for generating such ultraviolet light include, but should not be limited to, mercury-xenon lamps, high pressure mercury lamps, and metal halide lamps.

Some of these light sources generate heat during light emission to generate heat rays (infrared light). In some cases, such a light source may excessively increase the temperature of the solution during the irradiation step. Thus, an optical filter for shielding the heat rays may be disposed between the light source and the solution to be irradiated. Examples of such an optical filter include water filters in which water is encapsulated.

The solution is irradiated with ultraviolet light during the ultraviolet light irradiation step as described above. During this step, the solution is preferably stirred. An example temperature of the solution during the irradiation step may be, but should not be limited to, about 20° C. Because rhenium is readily oxidized as described above, the reduced species of rhenium generated in the solution through the ultraviolet light irradiation may be reoxidized into the perrhenate ions. For this reason, the ultraviolet light irradiation is preferably performed under an argon or nitrogen atmosphere.

The time needed for the ultraviolet light irradiation depends on the content of the perrhenate ions in the solution and the intensity of ultraviolet light emitted from the light source. Accordingly, the time for the ultraviolet light irradiation is preferably determined while the change in content of the perrhenate ions in the solution is being monitored for example, by ion chromatography. As one example, if an aqueous solution (10 mL) of 10.37 mmol/L of $KReO_4$, 9.02 mmol/L of acetone, and 0.50 mol/L of 2-propanol is irradiated with ultraviolet light from a mercury-xenon lamp (output: 200 W) while being stirred in an argon atmosphere, the content of the perrhenate ions in the solution reaches the detection limit of ion chromatography in about six hours.

The content of perrhenate ions contained in the solution is monitored by ion chromatography, for example, using a TSKgel IC-Anion-PWXL column made by Tosoh Corporation and a mobile phase containing 1.7 mmol/L $NaHCO_3$, 1.8 mmol/L $Na_2CO_3$, and an aqueous solution of 20% acetonitrile.

Separation

The separation step separates the reduced species of the perrhenate ions, which is precipitated through the ultraviolet light irradiation, from the solution. Rhenium is thereby recovered from the solution.

As described above, the precipitated reduced species of perrhenate ions is composed of $ReO_3$ containing hexavalent rhenium and $ReO_2$ containing tetravalent rhenium. The precipitated reduced species of the perrhenate ions is a solid, and is separated by a known process, such as solid-liquid separation. Examples of such solid-liquid separation include filtration and centrifugation.

The rhenium separated from the solution is subjected to a necessary treatment, and is recycled. As described above, the method of the present invention can separate rhenium from the solution containing the perrhenate ions by a simple procedure of adding an electron donor and a ketone compound to the solution, and then irradiating the solution with ultraviolet light.

<Selective Recovery of Rhenium from Solution Containing Rhenium and One or More Different Metals>

A method according to another embodiment of the present invention of selectively recovering rhenium from a solution containing rhenium and one or more different metals will now be described. The term "different metals" used herein does not include alkali metals and alkaline earth metals.

The method according to the present invention of selectively recovering rhenium from a solution containing rhenium and one or more different metals is characterized by addition of an electron donor, which is an aliphatic secondary alcohol or an aliphatic secondary thioalcohol, and a ketone compound to a solution containing the perrhenate ions and at least one co-existing metal (other than alkali metals and alkaline earth metals: the same applies hereinafter), and adjustment of the pH of the solution to 6.3 or higher. In the next step, the solution is irradiated with ultraviolet light to precipitate the reduced species of the perrhenate ions contained in the solution. In other words, this method can be performed according to the same procedure as in the "recovery of rhenium" method described above except that the solution contains rhenium and one or more different metals, and the pH of the solution is adjusted to 6.3 or higher. For this reason, differences will be mainly described without redundant description of the "recovery of rhenium" method.

Based on the following knowledge of the present inventor, the method according to the present embodiment has been completed. If an electron donor, which is an aliphatic secondary alcohol or an aliphatic secondary thioalcohol, and a ketone compound are added to a solution containing perrhenate ions and one or more co-existing metals, the pH of the solution is adjusted to 6.3 or higher, and the solution is irradiated with ultraviolet light, a precipitate is generated in the solution as in the "recovery of rhenium" method. Unexpectedly, the precipitate barely contains the co-existing metal(s), and predominantly contains the reduced species of the perrhenate ions. An examination on the total rhenium content and the content of the co-existing metal(s) left in the solution showed that the total rhenium content was almost zero (below the detection limit) while the content of the co-existing metal(s) remained almost unchanged. The method according to the present embodiment has been made based on such knowledge, and is used to recover rhenium in the form of precipitate from the solution containing the perrhenate ions and one or more co-existing metals.

In general, the co-existing metal contained with the perrhenate ions in the solution is barely present in the form of a zero-valent metal in the solution; rather, it is present in the form of an ion. Although the co-existing metal in the present embodiment should be strictly referred to as "a co-existing metal and an ion containing the co-existing metal" rather than as "a co-existing metal" for this reason, "a co-existing metal and an ion containing the co-existing metal" are collectively referred to as "a co-existing metal" in this specification.

The co-existing metal is a metal other than alkali metals and alkaline earth metals. Examples of such a metal include molybdenum, tantalum, aluminum, nickel, and copper. Among these metals, particularly preferred is molybdenum. The co-existing metal can be contained in the solution in any content that can be dissolved in a solvent to prepare a solution. An example content of the co-existing metal can be, but should not be limited to, about 1 mmol/L to 100 mmol/L.

A solution is prepared by the same operation as in the addition step of the "recovery of rhenium" method except that the solution contains a co-existing metal(s) and the pH of the solution is adjusted to 6.3 or higher. The pH of the solution can be adjusted to 6.3 or higher with an appropriate aqueous acidic solution and an appropriate aqueous alkaline solution. Examples of such an aqueous acidic solution and aqueous alkaline solution include a combination of an aqueous hydrochloric acid solution and an aqueous sodium hydroxide solution. The resulting solution is fed to the operation corresponding to the ultraviolet light irradiation step in the "recovery of rhenium" method, generating a precipitate, which is the reduced species of the perrhenate ions, in the solution.

The resulting precipitate is recovered by the operation corresponding to the separation in the "recovery of rhenium" method. The reduced species of the perrhenate ions can be thereby separated. Because the method according the present embodiment can selectively recover rhenium from a solution containing rhenium and one or more different metals, a small amount of rhenium can be recovered as a by-product during extraction of the main metal, such as extraction of molybdenum from molybdenum ore, or rhenium can also be recovered from alloys containing rhenium.

<Enrichment of Rhenium in Solution Containing Rhenium and One or More Different Metals>

The method according to one embodiment of the present invention of enriching rhenium in a solution containing rhenium and one or more different metals will now be described. The term "different metal" used herein does not include alkali metals and alkaline earth metals.

The method of enriching rhenium in a solution containing rhenium and one or more different metals according to the present invention is characterized in that an electron donor, which is an aliphatic secondary alcohol or an aliphatic secondary thioalcohol, and a ketone compound are added to a solution containing the perrhenate ions and at least one co-existing metal (other than alkali metals and alkaline earth metals: the same applies hereinafter), and the pH of the solution is adjusted to 4.7 or lower. The solution is then irradiated with ultraviolet light to precipitate a compound of the at least co-existing metal contained in the solution. In other words, this method can be performed according to the same procedure as in the "recovery of rhenium" method already described above except that the solution contains rhenium and one or more different metals and the pH of the solution is adjusted to 4.7 or lower. For this reason, differences will be mainly described without redundant description of the "recovery of rhenium" method.

Based on the following knowledge of the present inventor, the method according to the present embodiment has been completed. If an electron donor, which is an aliphatic secondary alcohol or an aliphatic secondary thioalcohol, and a ketone compound are added to a solution containing perrhenate ions and a co-existing metal, the pH of the solution is adjusted to 4.7 or lower, and the solution is irradiated with ultraviolet light, a precipitate is generated in the solution as in the "recovery of rhenium" method. Unlike the method described in the "recovery of rhenium" method, the precipitate contains a large amount of co-existing metal(s) and only a slight amount of the reduced species of the perrhenate ions. The co-existing metal(s) can be removed as a precipitate(s) from the solution through such an operation. The method of the present embodiment utilizes this knowledge, and is used to remove the co-existing metal(s) from a solution containing the perrhenate ions and the co-existing metal(s), enriching rhenium contained in the solution.

The types of co-existing metal and the content thereof in the solution according to the present embodiment are the same as that in the "selective recovery of rhenium from a solution containing rhenium and one or more different metals" method according to the embodiment described above, and thus their redundant description will be omitted.

A solution is prepared by the same operation as in the addition step of the "recovery of rhenium" method described above except that the solution contains at least one co-existing metal and the pH of the solution is adjusted to 4.7 or lower. The pH of the solution can be adjusted to 4.7 or lower with an appropriate aqueous acidic solution and an appropriate aqueous alkaline solution. Examples of such an aqueous acidic solution and aqueous alkaline solution include a combination of an aqueous hydrochloric acid solution and an aqueous sodium hydroxide solution. The solution preferably has a pH greater than 2.1. In this case, the solution has a pH of higher than 2.1 and up to 4.7. The resulting solution is fed to the operation corresponding to the irradiation step with ultraviolet light in the "recovery of rhenium" method described above, and a precipitate or a compound of the at least one co-existing metal is generated in the solution.

The resulting precipitate is removed from the solution by the operation corresponding to the separation step in the "recovery of rhenium" method described above. The at least one co-existing metal can be thereby separated from the solution. As a result, the proportion of the content of rhenium relative to the total metal content in the solution can be increased. An additional operation (that is, concentration operation) can be also performed to enrich rhenium in the solution. According to the method of the present embodiment, one or more "different metals" can be selectively removed from a solution containing rhenium and the "different metal(s)," for example, a small amount of rhenium can be recovered as a by-product during extraction of the main metal, such as extraction of molybdenum from molybdenum ore, or rhenium can also be recovered from alloys containing rhenium.

EXAMPLES

The method of recovering rhenium according to the present invention will now be described in more detail by way of examples below, but these examples should not be construed to limit the present invention.

Example 1 (Acetone Content: 12.0 Mmol/L)

An aqueous solution (10 mL) containing 2-propanol (0.50 mol/L), acetone (12.0 mmol/L), potassium perrhenate ($KReO_4$, 10.37 mmol/L), and sodium perchlorate ($NaClO_4$, 0.10 mol/L) as a reagent for keeping the ionic strength at a constant level was placed into a photoreaction cell. While being stirred in an argon atmosphere, the aqueous solution was irradiated with light over the ultraviolet to visible region (220 to 460 nm) from a mercury-xenon lamp. The aqueous solution was sampled after one hour, two hours, three hours, four hours, and six hours from the start of the irradiation to determine the amount of the perrhenate ions remaining in the aqueous solution by ion chromatography. The resulting change in content of the perrhenate ions plotted against the irradiation time is shown in FIG. 1. Ion chromatography was performed with a TSKgel IC-Anion-PWXL column made by Tosoh Corporation and a mobile phase containing 1.7 mmol/L of $NaHCO_3$, 1.8 mmol/L of $Na_2CO_3$, and an aqueous solution of 20% acetonitrile.

Example 2 (Acetone Content: 9.02 Mmol/L)

A change in content of the perrhenate ions in the aqueous solution against the time for the ultraviolet light irradiation was examined as in Example 1 except that the acetone content in the aqueous solution at the start of the test was 9.02 mmol/L. As in Example 1, the change in content of the perrhenate ions plotted against the irradiation time is shown in FIG. 1.

Example 3 (Acetone Content: 4.63 Mmol/L)

A change in content of the perrhenate ions in the aqueous solution against the time for the ultraviolet light irradiation was examined as in Example 1 except that the acetone content in the aqueous solution at the start of the test was 4.63 mmol/L. As in Example 1, the change in content of the perrhenate ions plotted against the irradiation time is shown in FIG. 1.

Example 4 (Acetone Content: 2.29 Mmol/L)

A change in content of the perrhenate ions against the time for the ultraviolet light irradiation was examined as in Example 1 except that the acetone content in the aqueous solution at the start of the test was 2.29 mmol/L. As in Example 1, the change in content of the perrhenate ions plotted against the irradiation time is shown in FIG. 1.

Comparative Example 1 (Acetone Content: 0 Mmol/L)

An aqueous solution (amount: 10 mL) containing 2-propanol (0.50 mol/L), potassium perrhenate ($KReO_4$, 10.37 mmol/L), and sodium perchlorate ($NaClO_4$, 0.10 mol/L) as a reagent for keeping the ionic strength at a constant level was placed into a photoreaction cell. While being stirred in an argon atmosphere, the aqueous solution was irradiated with light over the ultraviolet to visible region (220 to 460 nm) from a mercury-xenon lamp. The aqueous solution was appropriately sampled from the start of the irradiation to determine the concentration of the perrhenate ions remaining in the aqueous solution by ion chromatography. The solid content was centrifugally separated from each of the sampled aqueous solutions to determine the total rhenium content in the aqueous solution by inductively coupled plasma (ICP) atomic emission spectroscopy. The resulting change in content of perrhenate ions with the irradiation time is shown in FIG. 2 at (a) and a change in total rhenium content with the irradiation time is shown in FIG. 2 at (b).

FIG. 1 shows that the content of perrhenate ions started to decrease immediately after the start of the ultraviolet light irradiation in Examples 1 to 4 containing acetone in the aqueous solution. FIG. 1 also shows that the content of the perrhenate ions in the aqueous solution was decreased to below the detection limit after six hours from the start of the ultraviolet light irradiation in Example 2 containing 9.02 mmol/L of acetone. Comparison between the plots in Examples 1 and 2 shows that the effect of acetone was saturated under the test conditions where the content of the perrhenate ions was 10.37 mmol/L and the acetone content was 9.02 mmol/L or higher. The perrhenate ions removed from the aqueous solution were precipitated as a mixture of a hexavalent rhenium compound $ReO_3$ and a tetravalent rhenium compound $ReO_2$.

Figure 2:
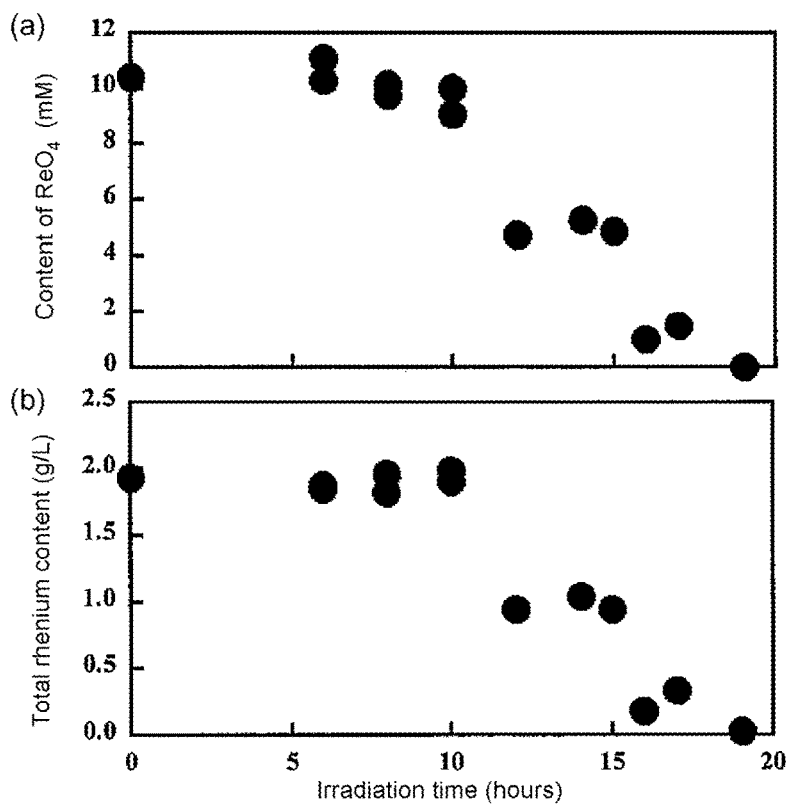
FIG. 2 is a graph representing a change in content of perrhenate ions plotted against the irradiation time in Comparative Example 1 at (a), and representing a change in total rhenium content in an aqueous solution plotted against the irradiation time in Comparative Example 1 at (b).

In contrast, FIG. 2 shows that in Comparative Example 1 not containing acetone in the aqueous solution, the content of the perrhenate ions in the aqueous solution started to decrease after about ten hours from the start of the ultraviolet light irradiation, and almost 20 hours was needed until the perrhenate ions in the aqueous solution completely disappeared.

Example 5 (Test of Selectivity to Rhenium)

The method of recovering rhenium according to the present invention was examined for the selectivity in recovery of rhenium to different metals. The co-existing metal used in the examination of the selectivity in recovery of rhenium was molybdenum, which is often present together with rhenium during recycling. In details, the rhenium recovery test was performed according to the present invention in the state where both rhenium and molybdenum existed to determine the selectivity of the recovery of rhenium.

An aqueous solution (10 mL) containing 2-propanol (0.50 mol/L), acetone (9.13 mmol/L), potassium perrhenate ($KReO_4$, 10.37 mmol/L; pure rhenium content: 1.93 g/L), potassium molybdate ($K_2MoO_4$, 10.37 mmol/L; pure molybdenum content: 0.99 g/L), and sodium perchlorate ($NaClO_4$, 0.10 mol/L; 0.99 g/L) as a reagent for keeping the ionic strength at a constant level was placed into a photoreaction cell. While being stirred in an argon atmosphere, the aqueous solution was irradiated with light over the ultraviolet to visible region (220 to 460 nm) from a mercury-xenon lamp. The solution had a pH of 6.3. The aqueous solution was sampled before the start of the irradiation and two hours, three hours, and six hours after the start of the irradiation. The solid content was centrifugally separated from each of the sampled aqueous solutions to determine the total rhenium content and the total molybdenum content in the aqueous solution by ICP (Inductively Coupled Plasma) atomic emission spectroscopy. The results are shown in Table 1.

TABLE 1

| Irradiation time (h) | Total rhenium content in aqueous solution (g/L) | Total molybdenum content in aqueous solution (g/L) |
|---|---|---|
| 0 | 1.93 | 0.99 |
| 2 | 1.39 | 0.99 |
| 3 | 0.80 | 0.98 |
| 6 | 0.02 | 0.92 |

Table 1 shows that the total rhenium content in the aqueous solution significantly decreased with time while the total molybdenum content in the aqueous solution slightly decreased. The solid content was centrifugally recovered from the aqueous solution sampled after six hours, and the mass proportion of the metal contained in the solid content was determined by ICP atomic emission spectroscopy. The content of rhenium was 59.9% by mass and that of molybdenum was 3.5% by mass in the solid content (29.85 mg). These results show that the method of recovering rhenium according to the present invention can selectively recover rhenium from the mixture of metal ions.

Example 6 (Test to Examine Change in Selectivity Against Change in pH)

An aqueous solution containing 2-propanol (0.50 mol/L), acetone (9.0 mmol/L), potassium perrhenate (KReO$_4$, 10.37 mmol/L), potassium molybdate (K$_2$MoO$_4$, 10.37 mmol/L), and sodium chlorate (NaClO$_4$, 0.10 mol/L) as a reagent for keeping the ionic strength at a constant level was adjusted with an aqueous hydrochloric acid solution or an aqueous sodium hydroxide solution to the pHs shown in Table 2. The pH-adjusted aqueous solutions (10 mL) were placed into photoreaction cells, and were irradiated with light for six hours from a mercury-xenon lamp while being stirred in an argon atmosphere. After the reaction, each solution was examined by ICP atomic emission spectroscopy to determine the total rhenium content and the total molybdenum content. If any precipitate was generated, the total rhenium content and the total molybdenum content in the precipitation were also determined. The results are shown in Table 2.

TABLE 2

| pH of solution before reaction | Total rhenium content in solution after reaction (mmol/L) | Total molybdenum content in solution after reaction (mmol/L) | Total rhenium content in precipitate (μmol) | Total molybdenum content in precipitate (μmol) |
|---|---|---|---|---|
| 1.9 | 10 | 10 | Not deposited | Not deposited |
| 2.1 | 10 | 10 | Not deposited | Not deposited |
| 4.7 | 10 | 4 | 3 | 61 |
| 9.1 | 0.1 | 9 | 103 | 11 |
| 12.5 | 0.2 | 10 | 97 | 4 |

Table 2 shows that almost all of the perrhenate ions in the sample solutions having a pH of 9.1 or higher were deposited in the precipitate after the light irradiation step. In contrast, the total molybdenum content in these sample solutions barely decreased, and molybdenum was barely contained in the precipitates in the sampled solutions. A similar result was also obtained in Example 5 where the same experiment was performed on the sample solution having a pH of 6.3, indicating that a solution having a pH of at least 6.3 enables selective precipitation of rhenium from the solution containing several metal ions. The sample solution having a pH of 4.7 showed the result opposite to these results, that is, the precipitate contained a larger amount of molybdenum than rhenium. It indicates that the selectivity of the metal to be precipitated varies depending on the pH of the solution. In conclusion, if the method according to the present invention is performed on a solution system containing rhenium and one or more different metals, rhenium can be selectively separated in the form of precipitate from a solution having a pH of 6.3 or higher, and the different metal(s) can be removed in the form of precipitate from a solution having a pH of 4.7 or lower. Accordingly, it is understood that the present invention provides a method of selectively recovering rhenium from a solution containing rhenium and one or more different metals.

The invention claimed is:

1. A method of recovering rhenium, comprising:
   (A) adding an electron donor and a ketone compound to a solution containing perrhenate ions, the electron donor being an aliphatic secondary alcohol or an aliphatic secondary thioalcohol,
   (B) irradiating the solution after the addition with ultraviolet light to precipitate a reduced species of the perrhenate ions contained in the solution, and
   (C) separating the reduced species of the perrhenate ions from the solution, the reduced species being precipitated during the ultraviolet light irradiation,
   wherein the pH of the solution is 6.3 or higher during step (B).

2. The method of recovering rhenium according to claim 1,
   wherein the electron donor is an aliphatic secondary alcohol.

3. The method of recovering rhenium according to claim 2,
   wherein the electron donor is 2-propanol.

4. The method of recovering rhenium according to claim 3,
   wherein the ketone compound is acetone.

5. The method of recovering rhenium according to claim 2,
   wherein the ketone compound is acetone.

6. The method of recovering rhenium according to claim 1,
   wherein the electron donor is 2-propanol.

7. The method of recovering rhenium according to claim 6,
   wherein the ketone compound is acetone.

8. The method of recovering rhenium according to claim 1,
   wherein the ketone compound is acetone.

9. A method of selectively recovering rhenium from a solution containing rhenium and one or more different metals, comprising:
   adding an electron donor and a ketone compound to a solution containing perrhenate ions and a co-existing metal other than alkali metals and alkaline earth metals, the electron donor being an aliphatic secondary alcohol or an aliphatic secondary thioalcohol;

adjusting the pH of the solution to 6.3 or higher; and irradiating the solution with ultraviolet light to precipitate a reduced species of the perrhenate ions contained in the solution, wherein the co-existing metal is molybdenum.

10. A method of enriching rhenium in a solution containing rhenium and one or more different metals, comprising:

adding an electron donor and a ketone compound to a solution containing perrhenate ions and a co-existing metal other than alkali metals and alkaline earth metals, the electron donor being an aliphatic secondary alcohol or an aliphatic secondary thioalcohol;

adjusting the pH of the solution to a range of higher than 2.1 and up to 4.7; and irradiating the solution with ultraviolet light to precipitate a compound of the co-existing metal contained in the solution, wherein the co-existing metal is molybdenum.

* * * * *

UNITED STATES PATENT AND TRADEMARK OFFICE
CERTIFICATE OF CORRECTION

Page 1 of 1

PATENT NO. : 10,480,048 B2
APPLICATION NO. : 15/746779
DATED : November 19, 2019
INVENTOR(S) : Hisao Hori It is certified that error appears in the above-identified patent and that said Letters Patent is hereby corrected as shown below:

On the Title Page

Item (30), Foreign Application Priority Data, insert --March 11, 2016 (JP) 2016-049036--

Signed and Sealed this
Fourth Day of February, 2020

Andrei Iancu
*Director of the United States Patent and Trademark Office*